(12) United States Patent
Schley-May et al.

(10) Patent No.: US 7,526,034 B2
(45) Date of Patent: Apr. 28, 2009

(54) METHOD AND APPARATUS FOR COMMUNICATING BETWEEN DEVICES HAVING NO COMMON ELECTRICAL GROUND

(75) Inventors: James T. Schley-May, Nevada City, CA (US); Michael Henderson, Grass Valley, CA (US)

(73) Assignee: 2wire, Inc., San Jose, CA (US)

( * ) Notice: Subject to any disclaimer, the term of this patent is extended or adjusted under 35 U.S.C. 154(b) by 19 days.

(21) Appl. No.: 11/681,136

(22) Filed: Mar. 1, 2007

(65) Prior Publication Data

US 2007/0242757 A1 Oct. 18, 2007

Related U.S. Application Data

(60) Provisional application No. 60/793,090, filed on Apr. 18, 2006.

(51) Int. Cl.
*H04B 3/00* (2006.01)
*H04L 25/00* (2006.01)

(52) U.S. Cl. .................. 375/258; 375/259; 379/413.02; 379/399.01; 330/165

(58) Field of Classification Search ......... 375/257–260, 375/295, 354, 377, 219–220; 379/413.02, 379/399.01, 413.04; 330/165, 171
See application file for complete search history.

(56) References Cited

U.S. PATENT DOCUMENTS

| | | | | |
|---|---|---|---|---|
| 4,121,054 A | * | 10/1978 | Popkin | .................. 370/498 |
| 4,157,567 A | * | 6/1979 | Scholz | ..................... 386/51 |
| 6,449,348 B1 | | 9/2002 | Lamb et al. | |
| 6,665,404 B2 | * | 12/2003 | Cohen | ...................... 379/413 |
| 6,975,723 B2 | * | 12/2005 | Scott et al. | ............. 379/413.02 |
| 7,149,903 B1 | * | 12/2006 | Chan et al. | .................. 713/300 |
| 7,305,006 B1 | * | 12/2007 | Bella | ........................ 370/463 |
| 2002/0003873 A1 | | 1/2002 | Rabenko et al. | |
| 2002/0073434 A1 | * | 6/2002 | Pience | ........................ 725/119 |
| 2002/0090962 A1 | | 7/2002 | Struhsaker et al. | |
| 2002/0122496 A1 | | 9/2002 | Klein-Reesink | |
| 2002/0136394 A1 | * | 9/2002 | Snow et al. | ............ 379/399.01 |
| 2003/0215020 A1 | * | 11/2003 | Dong et al. | ................. 375/258 |
| 2005/0180561 A1 | | 8/2005 | Hazani et al. | |
| 2006/0092671 A1 | * | 5/2006 | Yamashita | .................... 363/16 |
| 2006/0215771 A1 | * | 9/2006 | Scott et al. | ................... 375/257 |
| 2007/0085631 A1 | * | 4/2007 | Larson et al. | ............... 333/187 |
| 2007/0242757 A1 | | 10/2007 | Schley-May et al. | |
| 2007/0263852 A1 | | 11/2007 | Schley-May et al. | |

OTHER PUBLICATIONS

PCT International Search Report, PCT/US2007/007870 filed Mar. 28, 2007, mailed Dec. 18, 2007.

(Continued)

*Primary Examiner*—Jean B Corrielus
(74) *Attorney, Agent, or Firm*—Blakely, Sokoloff, Taylor & Zafman LLP

(57) ABSTRACT

Various methods, apparatuses, and systems are described in which devices having no common electrical ground communicate. In at least certain embodiments, an apparatus includes a transformer block to communicate a plurality of data signals and a synchronous clock signal between a first device with a first ground reference and a second device with a second ground reference over a data communication link. The first device sends the plurality of data signals to a modulator block having one or more Boolean logic gates that receive each data signal in combination with the synchronous clock signal. The modulator block sends a plurality of modulated data signals corresponding to the plurality of data signals to the transformer block. The transformer block sends the plurality of modulated data signals and the synchronous clock signal to the second device to provide the data communication link between devices having different ground references.

7 Claims, 8 Drawing Sheets

OTHER PUBLICATIONS

PCT Written Opinion of the International Searching Authority, PCT/US2007/007870 filed Mar. 28, 2007, mailed Dec. 18, 2007.
PCT Invitation to Pay Additional Fees and Communication Relating to the Results of the Partial International Search, International Application No. PCT/US2007/007870, International Filing Date Mar. 28, 2007, Mailed Oct. 1, 2007.
PCT International Preliminary Report on Patentability, PCT/US2007/007870 filed Mar. 28, 2007, mailed Oct. 30, 2008.

* cited by examiner

METHOD AND APPARATUS FOR COMMUNICATING BETWEEN DEVICES HAVING NO COMMON ELECTRICAL GROUND

RELATED APPLICATIONS

The present application is related to and hereby claims the priority benefit of commonly-owned and co-pending U.S. Provisional Patent Application No. 60/793,090, entitled "NETWORK INTERFACE DEVICE" filed Apr. 18, 2006, by James T. Schley-May and Michael Henderson.

FIELD OF THE DISCLOSURE

Embodiments of the disclosure generally relate to communication systems. More particularly, an embodiment of the disclosure relates to communicating between devices having no common electrical ground.

BACKGROUND OF THE DISCLOSURE

Typically, telecommunication systems that provide broadband access to residential customers contain a residential gateway which consists of an xDSL (any type of digital subscriber line generally communicated over copper lines) modem or xPON (any type of passive optical network generally communicated over optic fibers) interface combined with various local area networking (LAN) technologies to enable sharing the broadband access with other computers or devices within the residence. Wireless local area network standards and home phone line networking (HPNA) are examples of such LAN technologies. In addition, some telecommunication systems may provide a voice-over-internet-protocol (VOIP) feature to allow telephone calls via the broadband link. Some systems may, in addition to broadband access sharing, need to distribute broadband media content such as video streams into various locations within the residence.

Typically the residential gateway is located inside the house. However, it is desirable to locate the residential gateway at the network interface device (NID) outside the house. A NID is the point of demarcation between the Unbundled Network Element (UNE) loop and the end user's inside wire. Reasons for desirability of locating the residential gateway at the NID include to provide simplified installation wiring and to eliminate the need to have the user home when the bulk of installation occurs. Further, as fiber to the neighborhood rolls out, integration will be easier if the active electronics are already present at the NID. Also, installation practices can be merged between xPON and xDSL systems such that the primary network termination is the mere difference.

However, a significant problem in trying to locate the residential gateway at the NID is the problem of providing power. There is often no external source of alternating current (AC) power accessible at the NID location.

Another problem includes communicating between devices that are not able to share a common electrical ground. Current schemes for these communications are relatively expensive for conducting multiple channels of synchronous high speed data. These current schemes for providing multiple channels of synchronous high speed data between devices which can not share a common electrical ground require the use of expensive optoelectronics or the use of high frequency modulation schemes. These schemes consume large amounts of power and add substantially to the complexity of the communication links

SUMMARY OF THE DISCLOSURE

Various methods, apparatuses, and systems are described in which devices having no common electrical ground communicate. In one embodiment, an apparatus includes a transformer block having output and input ports to communicate a plurality of data signals and a synchronous clock signal between a first device with a first voltage ground reference and a second device with a second voltage ground reference over a data communication link. The first device sends the plurality of data signals to one or more input ports of a modulator block having one or more Boolean logic gates that receive each data signal in combination with the synchronous clock signal. One or more output ports of the modulator block send a plurality of modulated data signals corresponding to the plurality of data signals to the input ports of the transformer block. The one or more output ports of the transformer block send the plurality of modulated data signals and the synchronous clock signal to the second device to provide the data communication link between devices having no common electrical ground.

BRIEF DESCRIPTION OF THE DRAWINGS

The drawings refer to embodiments of the disclosure in which.

Figure 1:
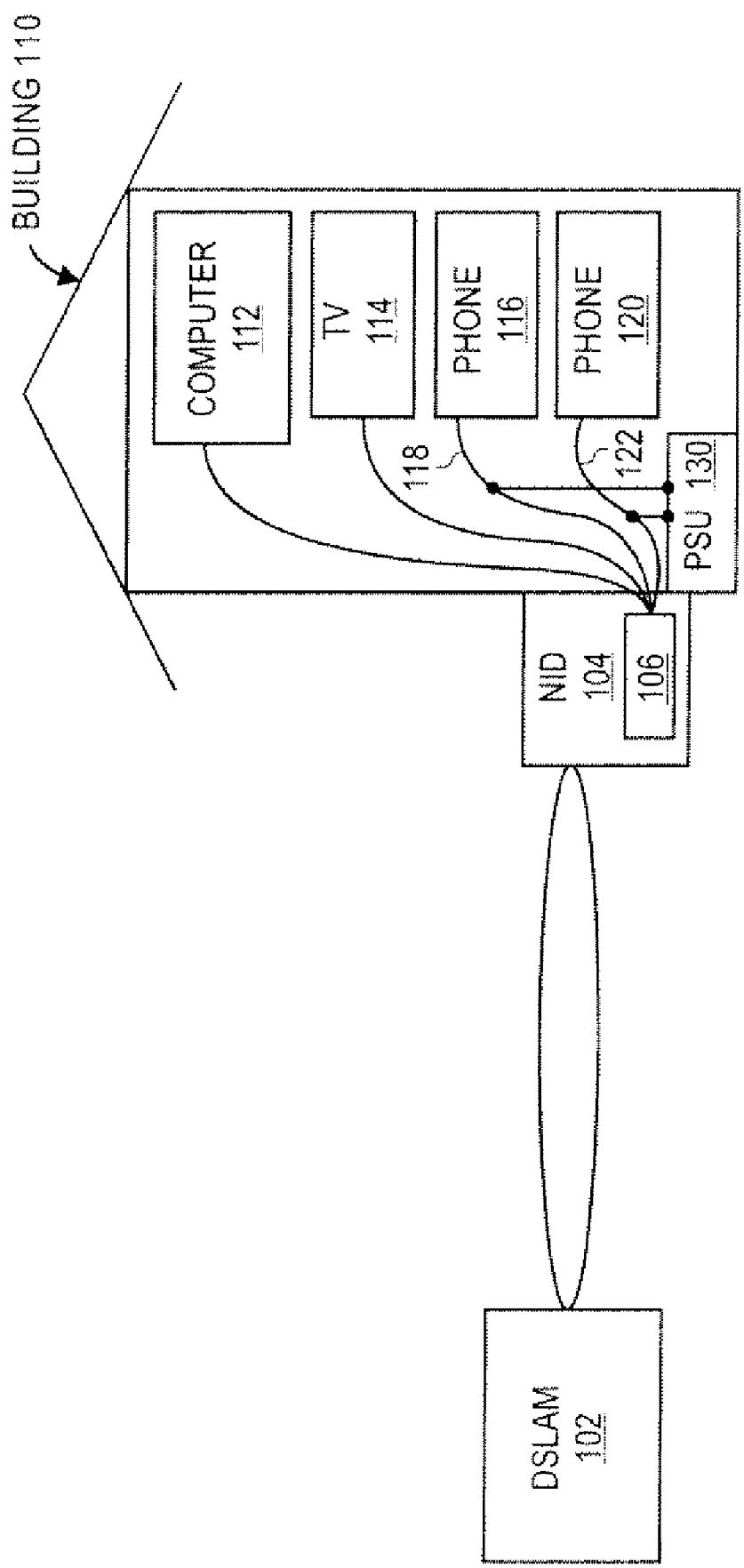
FIG. 1 shows a block diagram of an embodiment of a central office containing a Digital Subscriber Loop Access Multiplexer sending communications across an Unbundled Network Element (UNE) loop to a network interface device.

While the disclosure is subject to various modifications and alternative forms, specific embodiments thereof have been shown by way of example in the drawings and will herein be described in detail. The disclosure should be understood to not be limited to the particular forms disclosed, but on the contrary, the intention is to cover all modifications, equivalents and alternatives falling within the spirit and scope of the disclosure.

DETAILED DISCUSSION

In the following description, numerous specific details are set forth, such as examples of specific signals, named components, connections, number of windings in a transformer, example voltages, etc., in order to provide a thorough understanding of the present disclosure. It will be apparent, however, to one of ordinary skill in the art that the present disclosure may be practiced without these specific details. In other instances, well known components or methods have not been described in detail but rather in a block diagram in order to avoid unnecessarily obscuring the present disclosure. The specific details set forth are merely exemplary. Further specific numeric references such as a first device, may be made. However, the specific numeric reference should not be interpreted as a literal sequential order but rather interpreted that the first device is different than a second device. Thus, the specific details set forth are merely exemplary. The specific details may be varied from and still be contemplated to be within the spirit and scope of the present disclosure. The term coupled is defined as meaning connected either directly to the component or indirectly to the component through another component.

Various methods, apparatuses, and systems are described in which a communications between devices having no common electrical ground occur with a bi-directional communication link. In one embodiment, an apparatus includes a transformer block having output and input ports to communicate a plurality of data signals and a synchronous clock signal between a first device with a first voltage ground reference and a second device with a second voltage ground reference over a data communication link. The first device sends the plurality of data signals to one or more input ports of a modulator block having one or more logic gates that receive each data signal in combination with the synchronous clock signal. One or more output ports of the modulator block send a plurality of modulated data signals corresponding to the plurality of data signals to the input ports of the transformer block. The one or more output ports of the transformer block send the plurality of modulated data signals and the synchronous clock signal to the second device to provide the data communication link between devices having no common electrical ground with minimal data distortion.

In some embodiments, the apparatus further includes input ports of a demodulator block to receive at least one modulated data signal and the synchronous clock signal from the transformer block. Output ports of the demodulator block send at least one demodulated data signal to a third device designed to receive a continuous voltage signal. The demodulated data signal restores a format of a data signal that originated from the first device.

FIG. 1 shows a block diagram of an embodiment of a central office containing a Digital Subscriber Loop Access Multiplexer (DSLAM) sending communications across an Unbundled Network Element (UNE) loop to a network interface device (NID). A NID is the point of demarcation between the Unbundled Network Element (UNE) loop and the end user's inside wire. The DSLAM 102 sends communications to the NID 104 located outside a building 110. The NID 104 includes a communication gateway 106 that routes various types of communications, such as data, voice, and video, into the building 110. The communications may be sent to a computer 112, television 114, phone 116, and phone 120. The NID 104 performs interface functions, such as code conversion, protocol conversion, and buffering, required for communications to and from a network. The NID 202 converts each device protocol into a common transmission protocol. The building 110 may be any type of building, residence, dwelling, or structure that has an internal power source and phone service. In one embodiment, the communication gateway 106 is a residential gateway located outside of a residence.

Voice data is sent from the communication gateway 106 located in the NID 104 to the phone 116 and the phone 120 via a first phone line 118 and a second phone line 122, respectively. A power supply unit (PSU) 130 located inside the building 110 couples via the first phone line 118 and the second phone line 122 to the NID 104 to provide isolated (non-grounded) DC power to the NID 104. The PSU 130 is located close to both a conventional power source such as a 120 volt alternating current (AC) outlet and telephone wiring. The PSU 130 converts the energy from the conventional power source into a form compatible with low voltage, low current telephone wiring already present in the building 110. In order to avoid induction or conduction of electrical noise into the telephone wiring of the building 110, the outgoing power conductors of the PSU 130 and NID 104 are not connected to earth ground.

In one embodiment, the NID 104 includes a data isolation scheme for communications between devices having no common electrical ground or voltage ground reference. The NID 104 includes a transformer block having output and input ports to communicate a plurality of data signals and a synchronous clock signal between a first device with a first voltage ground reference and a second device with a second voltage ground reference over a data communication link.

The design for the NID 104 provides multiple channels of high speed data between devices with different electrical grounds. The transformer block implements low cost transformers, such as those used in Ethernet applications, in conjunction with a simple data clock rate modulation scheme that has minimal logic in order to provide a minimal cost, multiwire, data communication link between devices without a common electrical ground.

Figure 2:
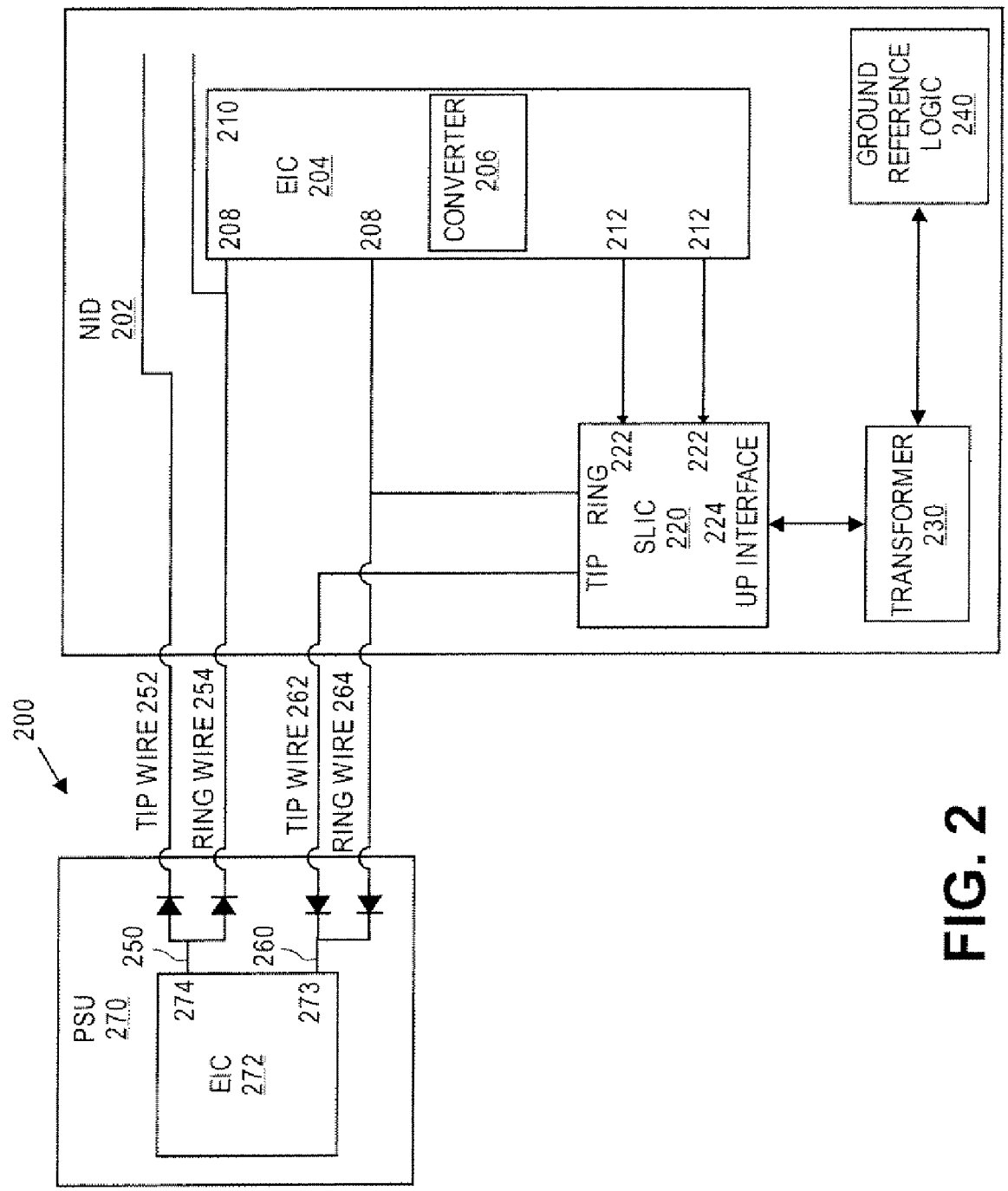
FIG. 2 shows a block diagram of an embodiment of providing DC power to a network interface device via telephone lines.

FIG. 2 shows a block diagram of an embodiment of providing DC power to a network interface device via telephone lines. The block diagram 200 includes a power supply unit (PSU) 270 with an electrical isolation component (EIC) 272 and ports 274 and 273 that couple via phone lines 250 and 260, respectively, to a network interface device (NID) 202. The NID 202 also includes an electric isolation component (EIC) 204 with a converter 206 and a subscriber line interface circuit (SLIC) 220. The SLIC 220 couples to the PSU 270 via a tip wire 262 and a ring wire 264 of the phone line 260. The SLIC 220 includes a microprocessor that couples to an isolation transformer 230. The isolation transformer 230, which includes multiple transformers, receives a plurality of digital signals from ground referenced logic 240 contained in the NID 202.

The EIC 204 of the NID 202 receives isolated DC voltage from the PSU 270 via a ring wire 254 of phone line 250 and then converts that voltage into a supplied ground referenced DC voltage 210 and at least one isolated DC voltage 212. The EIC 204 provides isolated DC voltage to each SLIC, such as isolated DC voltage 212 being received by input 222 of the SLIC 220.

In one embodiment the EIC 272 of the PSU 270 generates an isolated 29V DC power supply and sends this voltage via an output port 274 across the ring wire 254 to an input 208 of the EIC 204. The EIC 204 receives an isolated DC signal between 15 and 29 volts depending on the voltage drop or loss across the ring wire 254. Then, a converter 206 of EIC 204 converts the received isolated DC signal into a 12V DC ground referenced supply within plus or minus 5 percent. The converter 206 also converts the received isolated DC signal into a 12V DC isolated supply that powers the input 222 of the SLIC 220.

In another embodiment, the NID 202 includes two SLIC devices. Each SLIC device is coupled to a phone line and isolation transformer. Each SLIC device is powered with a 12V DC isolated supply received from output ports of EIC 204.

In at least certain embodiments, the transformer 230 and data isolation scheme provide a communication link between the ground referenced logic 240 and the SLIC 220. The transformer 230 has output and input ports to communicate a plurality of data signals and a synchronous clock signal between the ground referenced logic 240 and the non-ground referenced SLIC 220 over a data communication link. The logic 240 sends the plurality of data signals to one or more input ports of a modulator block (not shown) having one or more logic gates that receive each data signal in combination with the synchronous clock signal. One or more output ports of the modulator block send a plurality of modulated data signals corresponding to the plurality of data signals to the input ports of the transformer 230. The one or more output ports of the transformer 230 send the plurality of modulated data signals and the synchronous clock signal to the SLIC 220 to provide the data communication link between devices having no common electrical ground with minimal data distortion.

The SLIC 220 may drive telephones, thus enabling a virtual phone line. The NID 202 having a residential gateway provides the termination point for the feed line, which may be xDSL feed line or fiber feed line if xPON. In addition to broadband media content, it will provide the IP connection necessary for VoIP. The voice data is encoded and decoded by a processor and sent through the subscriber line interface circuit (SLIC). The SLIC provides the central office functionality to any phones connected to the phone line. The SLIC has a phone filter in front of it to provide impedance isolation and filtering. The phone filter can be a multi-order bidirectional lowpass filter. The residential gateway may optionally have other communication ports on it, such as coaxial cable or wireless. The residential gateway may optionally support HPNA networking to enable media content delivery to HPNA devices such as set top boxes within the residence.

In one embodiment, the PSU 270 plugs into 120V AC mains and generates a 29 VDC power signal that is injected onto one wire of each phone line. It is to be appreciated that other voltages would also work.

Generation of the 29 VDC power signal may be accomplished by using a rectifier connected to a power amplifier. In an embodiment the PSU 270 generates a 29V DC signal with a current limit of 1 ampere. The power rail for the power amplifier is made from rectified and filtered line voltage that may be transformer isolated. Diodes are shown on the output and input of the PSU 270 to allow TIP and RING telephone wiring reversals at the remote outdoor location, such as NID 202. The 29 VDC signal powers the NID 202. The NID 202 filters and converts the 29 V DC signal to a 12V DC signal. The filtered signals of positive and negative voltage are then used to feed the multitude of switching power supply regulator circuits that are required in the residential gateway. Similarly, the 12V DC SLIC power supply is DC isolated from all other power supplies.

In one embodiment, the PSU 270 has a DC power source such as a battery or fuel cell. This way, the PSU 270 continues to function if a brown out occurs or if a user unplugs and replugs the power module.

As previously discussed, to avoid induction or conduction of electrical noise into the telephone wiring of the residence or building, the outgoing power conductors of the PSU 270 are not connected to earth ground. Because current leaves the PSU 270 on the ring/tip wires 252 and 254 of the first phone line 250 and returns on the tip/ring wires 262 and 264 of the second phone line 260, each telephone wire pair experiences no imposed current between the two wires which comprise one telephone pair. An imposed voltage of less than 5V may be developed which depends on the length of wires 250 and 260. Subscriber line interface circuits that use lines 250 and 260 can be made to compensate or null out the imposed voltage so as to not effect operation. For the same reason, no electrical impedance change is perceivable between the wires of any one telephone pair; allowing telephone use on each pair to proceed as if the power distribution scheme was not present. To avoid similar problems with electrical noise, the power input circuitry of the NID 202 at the residential location is also not connected to earth ground. The power received at an input 208 of an electrical isolation component (EIC) 204 of the NID 202 is converted by a converter 206 into power sources that may be referenced to earth ground (output 210) or referenced to yet another electrical node that is not connected to earth ground nor to any of the four wires used for telephone service within the building. Any one of isolated outputs 412 of the EIC 204 can be referenced to a node within any one telecommunications device such as a subscriber line interface circuit because any current which leaves that device (including that provided by its isolated power source) on one wire of its telephone signaling pair must return to it via it the other wire of its pair.

Figure 3:
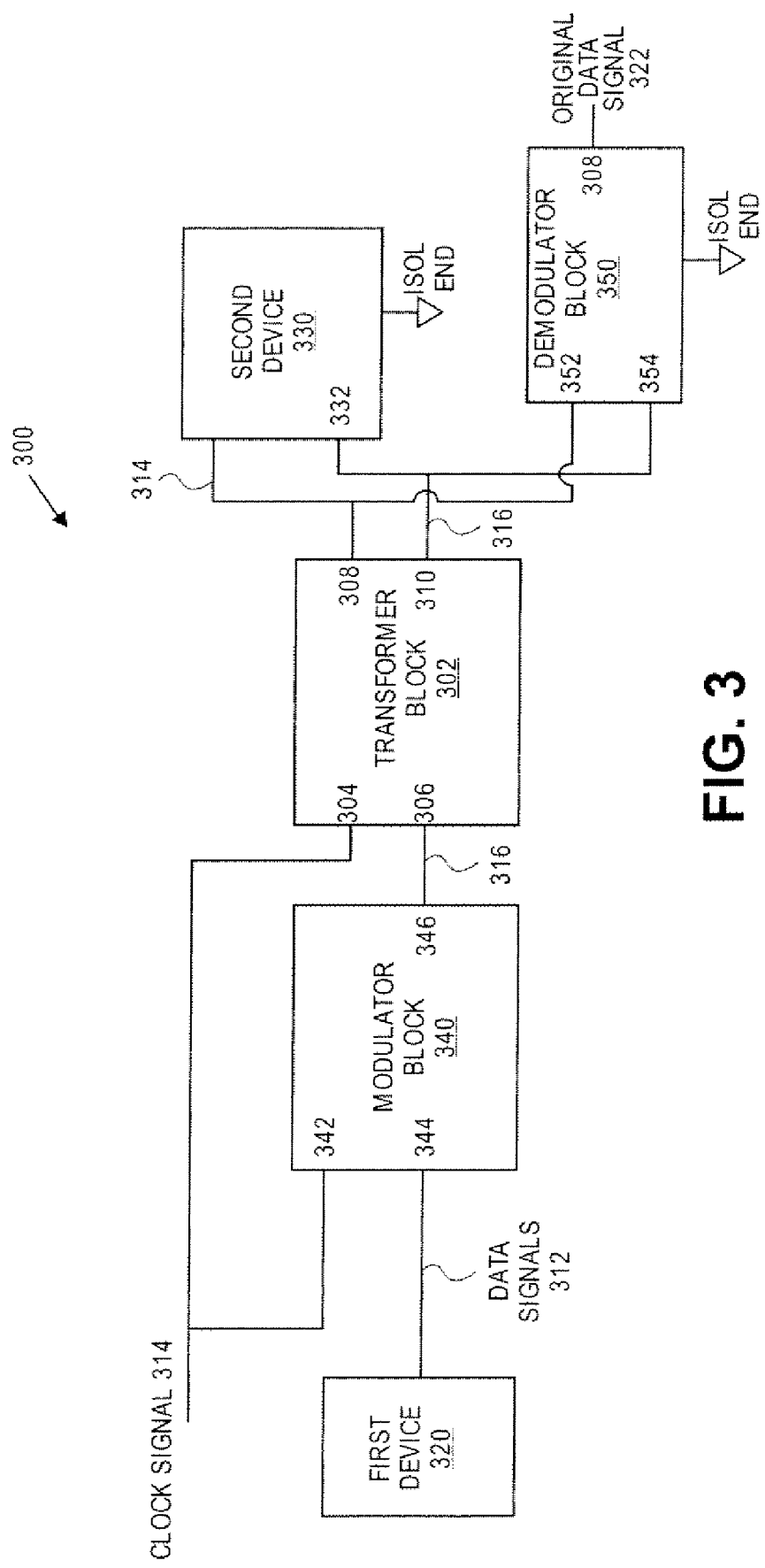
FIG. 3 shows a block diagram of an embodiment of a data isolating scheme for communicating between devices having no common electrical ground.

FIG. 3 shows a block diagram of an embodiment of a data isolating scheme for communicating between devices having no common electrical ground. The data isolating scheme conducts multiple channels of synchronous high speed data between devices that cannot share a common electrical ground. The circuit may be used in a NID or other device that uses an ungrounded power supply.

In at least certain embodiments, an apparatus 300 includes a transformer block 302 having input ports 304 and 306 and output ports 308 and 310 to communicate a plurality of data signals 312 and a synchronous clock signal 314 between a first device 320 with a first voltage ground reference and a second device 330 with a second voltage ground reference over a data communication link. The plurality of data signals 312 may have a frequency approximately equal to the frequency of the synchronous clock signal 314. The transformer block 302 may include a plurality of common pulse transformers having a frequency range that includes the fundamental frequency range of the plurality of data signals 312. In an embodiment, the common pulse transformers have a frequency range of thirty to one and the plurality of data signals 312 have a frequency range of two to one.

The first device 320 sends the plurality of data signals 312 to one or more input ports 342 and 344 of a modulator block 340 having one or more Boolean logic gates that receive each data signal in combination with the synchronous clock signal 314. In one embodiment, each Boolean logic gate in the modulator block 340 is an XOR gate that is coupled to clock delay logic to receive each data signal.

One or more output ports 346 of the modulator block 340 send a plurality of modulated data signals 316 corresponding to the plurality of data signals 312 to the one or more input ports 306 of the transformer block 302. The one or more output ports 310 of the transformer block 302 send the plurality of modulated data signals 316 to one or more input ports 332 of the second device 330 to provide the data communication link between devices having different voltage ground references with minimal data distortion. The clock signal 314 is also sent from the transformer block 302 to the second device 330.

In some embodiments, the apparatus 300 further includes input ports 352 and 354 of a demodulator block 350 to receive at least one modulated data signal 316 and the synchronous clock signal 314 from the transformer block 302. One or more output ports 356 of the demodulator block 350 send at least one demodulated data signal 322 to a third device (not shown) designed to receive a continuous demodulated voltage signal The demodulated or original data signal 322 restores a format of a data signal that originated from the first device 320. The demodulator block 350 may include an edge-triggered master/slave flip-flop for each data signal to be demodulated.

Figure 4:
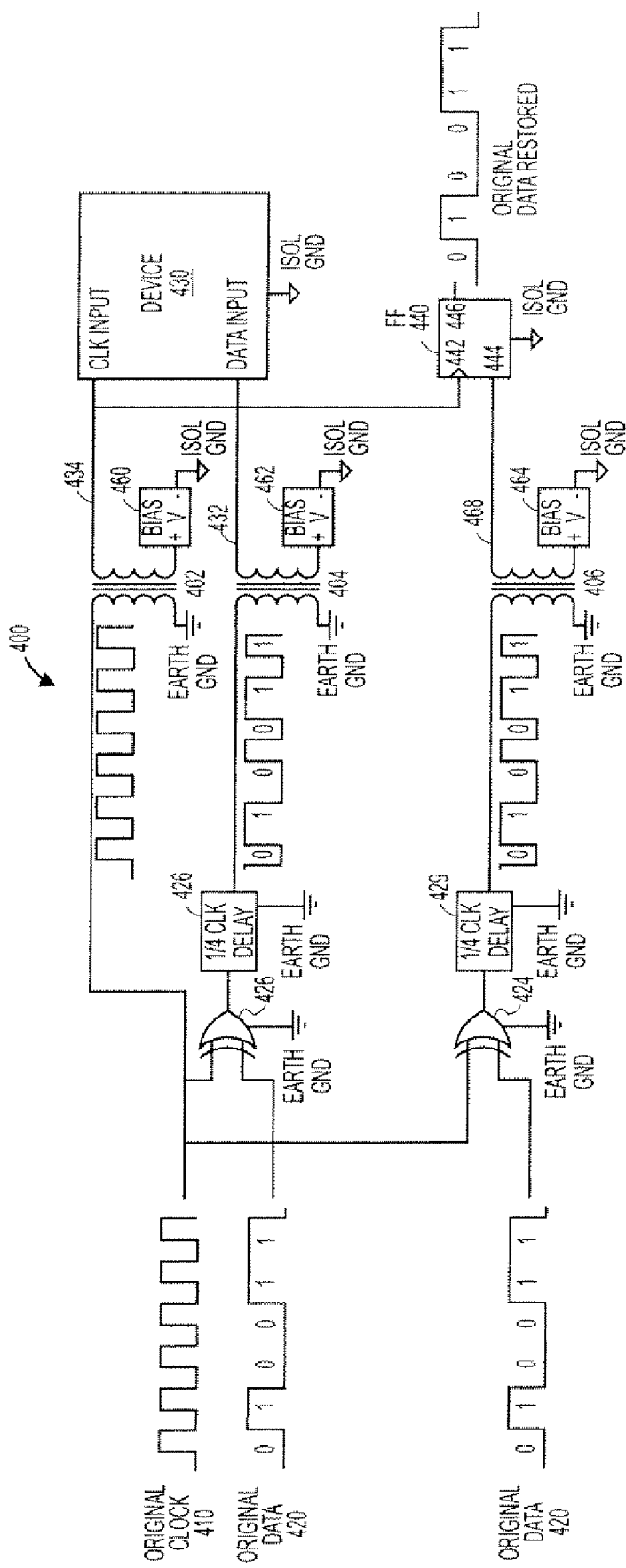
FIG. 4 shows a block diagram of another embodiment of a data isolating scheme for communicating between devices having no common electrical ground.

FIG. 4 shows a block diagram of another embodiment of a data isolating scheme for communicating between devices having no common electrical ground. The design conducts multiple channels of synchronous high speed data between devices that cannot share a common electrical ground. The design may be used in the NID or other device that uses an ungrounded power supply. As previously discussed, this scheme exploits inexpensive transformers 402, 404, and 406, in combination with a simple data clock rate modulation scheme implemented with minimal logic to implement a minimal cost, multi-channel, binary data serial communication link between devices without a common electrical ground.

The data to be transferred between devices may be binary voltages synchronous with a binary voltage clock signal 410, which is transferred along with the data. Thus, the clock signal 410 is sent along with the data signal 420 that is modulated. The data signal 420 may have a frequency approximately equal to the frequency of the synchronous clock signal 410. The modulation may occur in a variety of ways.

In an embodiment, each data signal 420 is modulated based on an exclusive or (XOR) gate (e.g., 422 and 424) and a quarter clock delay logic (e.g., 426 and 428). The data to be transferred is presented to the input of an electrical transformer (e.g., data transformer 404 or 406) in original (high or low logic state) form for a duration of one half of each clock cycle. The same data is presented to the input of the same transformer in inverted form during the other half of each clock. The clock signal 410 is presented to the input of a clock transformer 402. This same logic function is performed on each signal to be transferred between the ground isolated devices. The clock signal 410 along with the data signal 420 use a modulation scheme that limits the bandwidth to fit within the bandwidth of the transformers 402, 404, and 406.

A logic device 430 receiving a modulated data signal 432 and a clock signal 434 can use the received clock signal 434 available at the output of the clock transformer 402 to capture the data signal 420 in its original form. The clock signal 434 is based on the original clock signal 410 and may be the same clock signal. One output lead of the data transformer 404 can be connected to a bias voltage 462 near the 1/0 (hi/low logic state) transition voltage of the receiving logic device 430. This will ensure that the high and low voltages produced by the output of the data transformer 404 are well placed in the voltages ranges defined for logical high and low voltage levels of the receiving device 430. Receiving devices that require a continuous voltage (not modulated), can be passed through a flip-flop (FF) 440. The receiving clock signal 434 can be connected to the clock input 442 of the FF 440 while the receiving data can be connected to the data or 'D' input 444 of the flip-flop 440. The 'Q' output 446 restores the original data signal 420 for a receiving device (not shown). In an embodiment, the FF 440 is an edge triggered master/slave flip-flop.

Since devices on both sides of the communication link have access to the same clock signal 410 (even though it may have originated on one side), devices on both sides of the link can utilize the clock signal 410 to transmit and receive data across the communication link. One additional transformer is required for each data signal to be transferred. Non-critical phase asynchronous signals can also be transferred across the communication link, using the aforementioned FF 440 to 'demodulate' the signal before using it.

Because the average voltage of each bit of data is constant, the transformers provide little distortion of that data. Because the fundamental frequency of the data signal falls within a two to one range, the resulting spectrum fits well within that of common pulse transformers.

The electrical logic family used to transmit or receive the data is limited only by its ability to drive a transformer and detect voltages from that transformers output winding. This means that receivers can be differential, the drivers can be differential, or both can be differential. Also, the receivers and drivers can be a mixture of differential and single ended devices. Thus, a few of many possibilities for differential and/or single ended signaling are illustrated in the logic used in the data isolation schemes of FIGS. 5 and 6.

Figure 5:
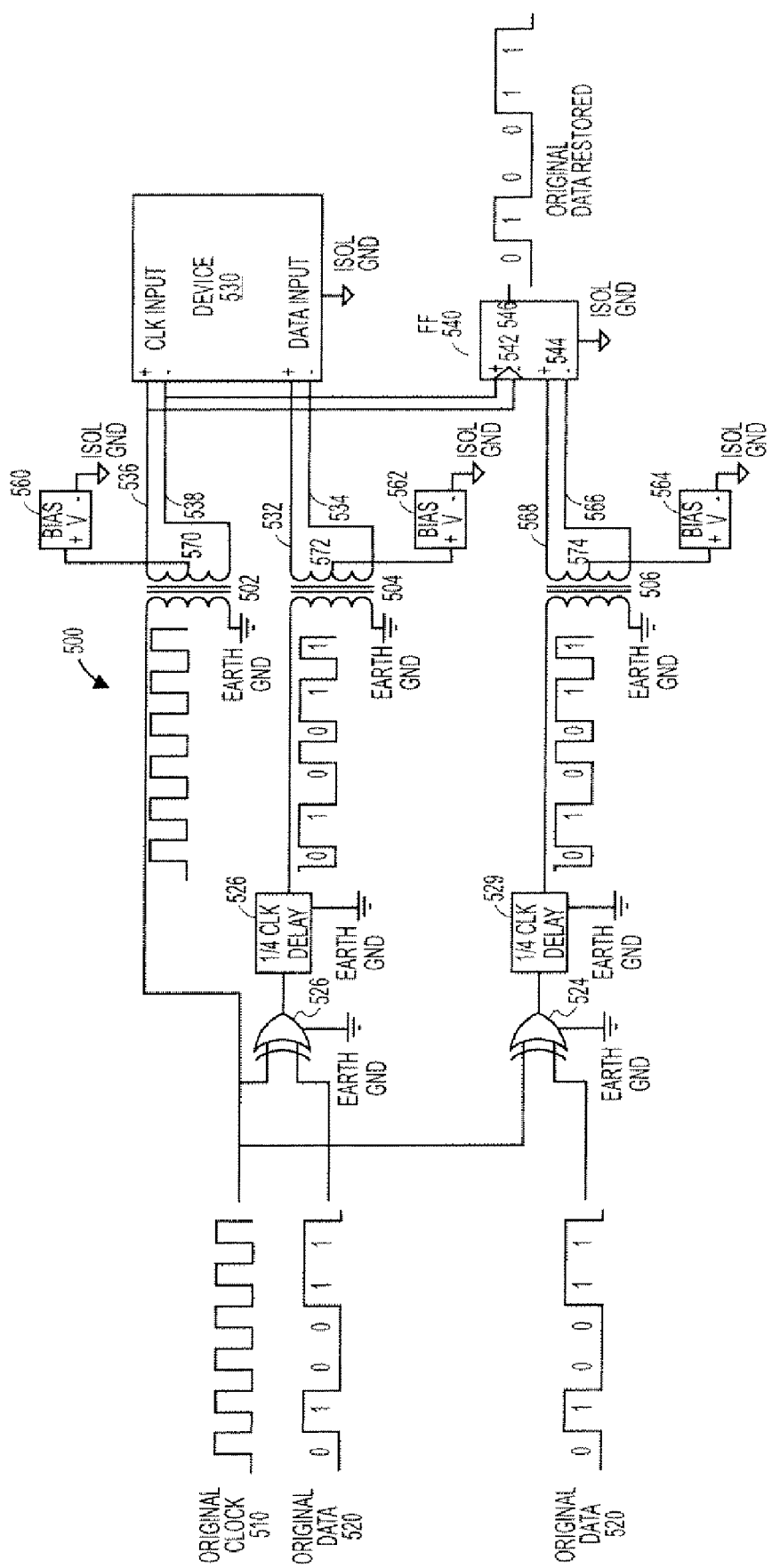
FIG. 5 shows a block diagram of another embodiment of a data isolating scheme for communicating between devices having no common electrical ground.

FIG. 5 shows a block diagram of another embodiment of a data isolating scheme for communicating between devices having no common electrical ground. Differential logic can be used for driving or receiving, and if differential receivers are used, it may be unnecessary to apply bias circuitry to the transformer output depending on the specific receiving logic device. Differential logic receivers that require a specific common mode bias voltage can be satisfied by applying a suitable bias voltage 560, 562, or 564 to a center tap 570, 572, or 574, respectively, in the output winding of the transformer as illustrated in FIG. 5. FIG. 5 shows a block diagram of a similar data isolating scheme as compared to FIG. 4. However, the data isolating scheme of FIG. 5 implements differential receiving logic that require a specific common mode bias voltage as discussed above.

Figure 6:
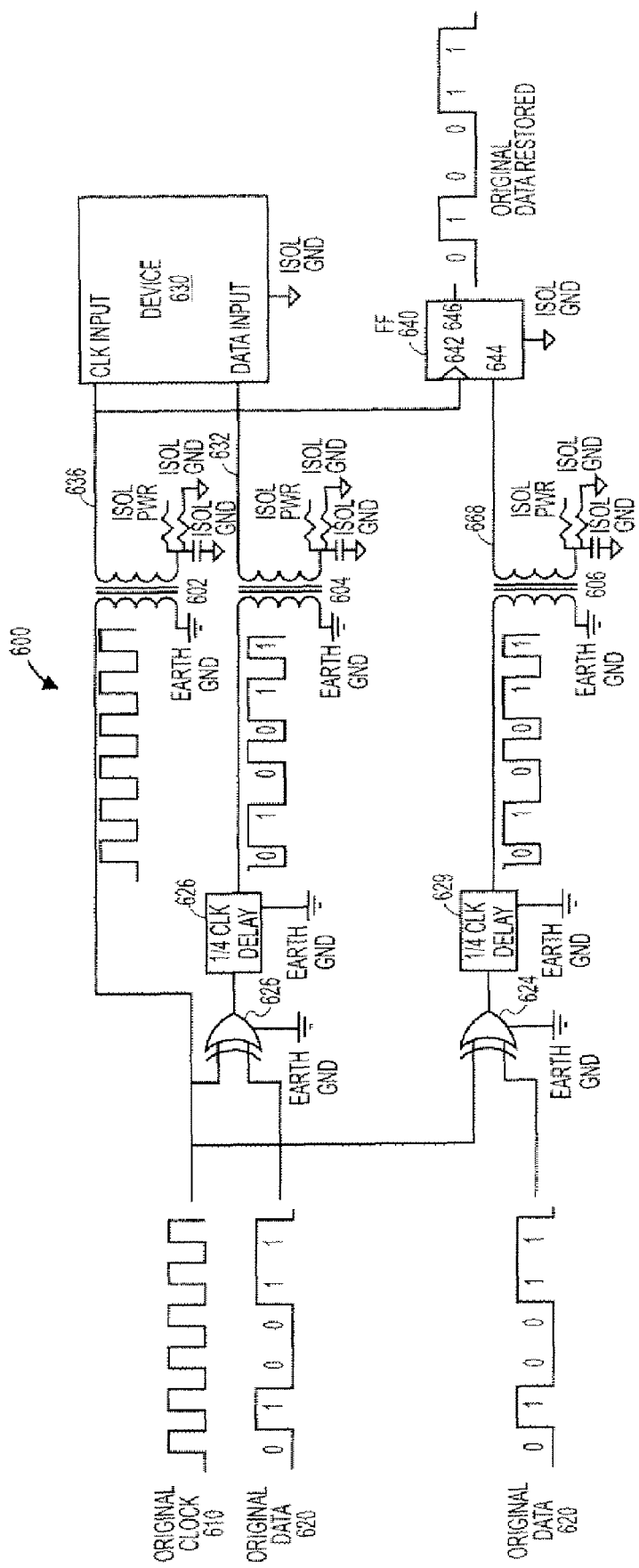
FIG. 6 shows a block diagram of another embodiment of a data isolating scheme for communicating between devices having no common electrical ground.

FIG. 6 shows a block diagram of another embodiment of a data isolating scheme for communicating between devices having no common electrical ground. Single ended logic can utilize a simple resistive divider from a receiving logic power supply to ground and capacitor to ground at the junction point of the divider to bias the unmonitored end of the transformer output winding. Single ended logic receives the clock signal 636 and data signals 632 and 668. One output lead 638, 634, and 666 of the each transformer 602, 604, and 606, respectively, is connected to the simple resistive divider as illustrated in FIG. 6. FIG. 6 shows a block diagram of a similar data isolating scheme as compared to FIG. 5. However, the data isolating scheme of FIG. 6 implements single ended receiving logic with one output lead of the transformers connected to the simple resistive divider.

Some schemes for providing multiple channels of synchronous high speed data between devices that cannot share a common electrical ground require the use of expensive optoelectronics or the use of high frequency modulation schemes that consume relatively large amounts of power and add substantially to the complexity of the communications links. These transformer schemes may utilize the insertion of additional bits of data into the data stream or required a relatively high frequency clock to allow the data to be imposed on a carrier signal whose phase is not important relative to the data phase due to a large carrier to clock frequency ratio. These schemes use far more circuitry than the proposed scheme and impose significant delay on the data relative to the proposed scheme. Also, opto-isolator based schemes working at multi-megahertz frequencies use components costing much more that the transformer and logic used in this scheme.

Figure 7:
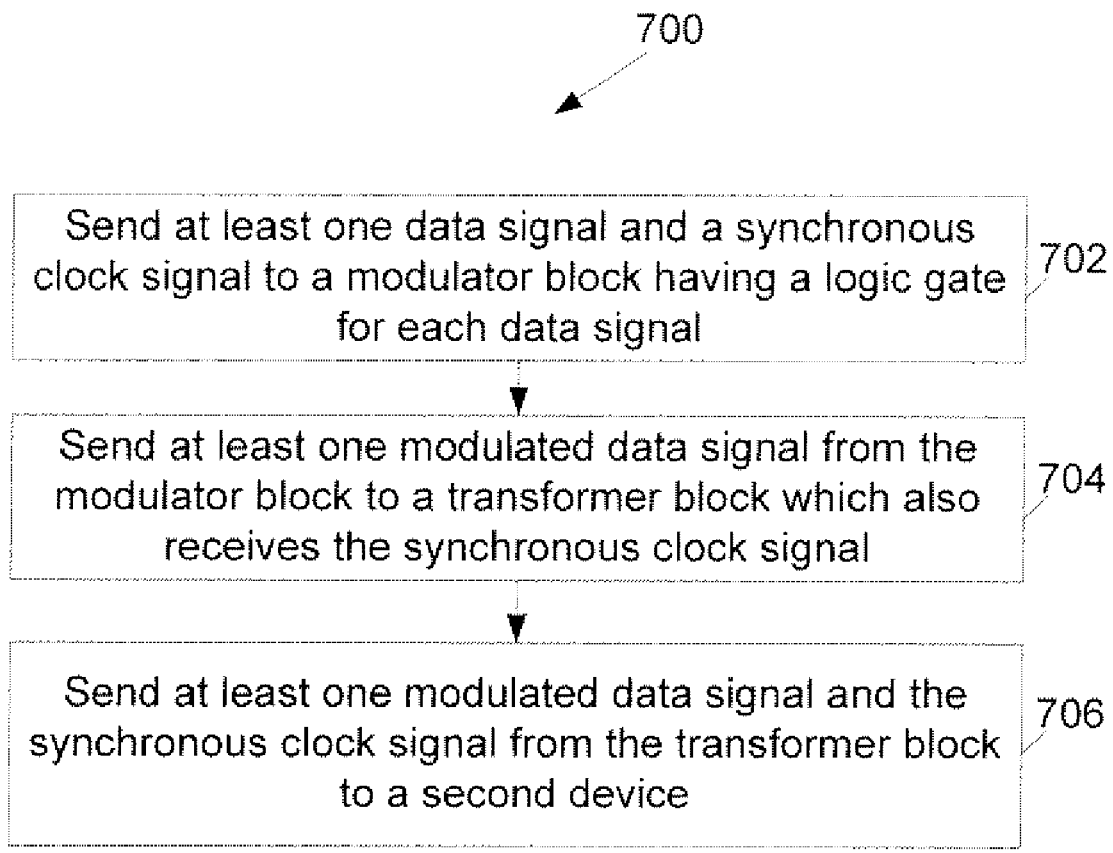
FIG. 7 shows a method for an embodiment of communicating between devices having no common electrical ground.

FIG. 7 shows a method for an embodiment of communicating between devices having no common electrical ground. The method 700 includes sending at least one data signal and a synchronous clock signal to a modulator block having a logic gate for each data signal at block 702. The method 700 further includes sending the at least one modulated data signal from the modulator block to a transformer block which also receives the synchronous clock signal at block 704. The method 700 further includes sending the at least one modulated data signal and the synchronous clock signal from the transformer block to a second device at block 706.

In at least certain embodiments a NID provides communication between devices having no common electrical ground. A device within the NID sends the at least one data signal to the modulator block at block 702. A synchronous clock signal is also sent to the modulator block which generates a modulated data signal that is sent to a transformer block at block 704. As illustrated in FIGS. 3-6, the transformer block sends at least one modulated data signal and the synchronous clock signal to a second device at block 706. The second device may be a subscriber line interface circuit that performs interface functions and drives a phone line within the building. The communication between the first and second device occurs with minimal data distortion and minimal logic required.

Figure 8:
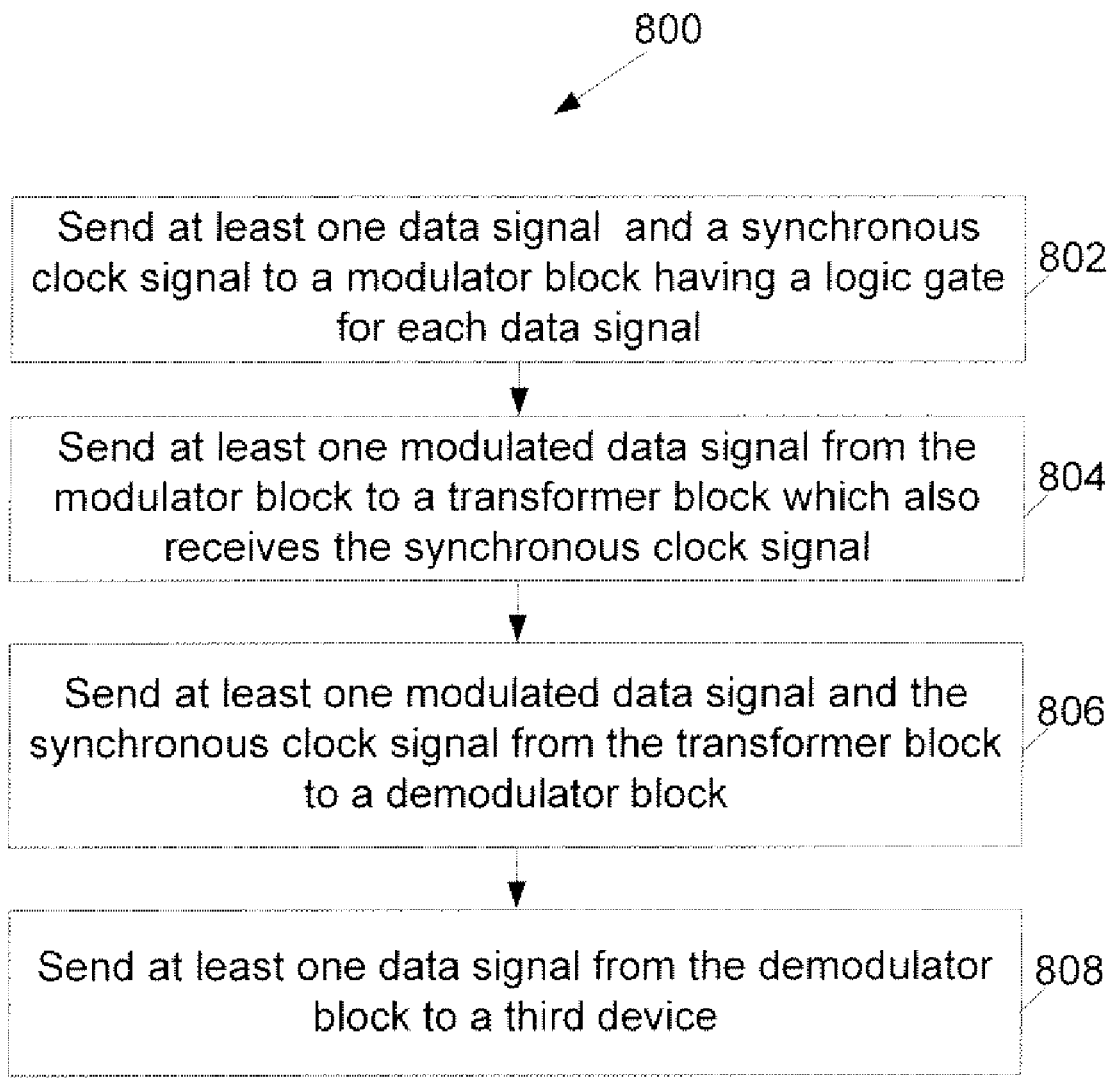
FIG. 8 shows a method for another embodiment of communicating between devices having no common electrical ground.

FIG. 8 shows a method for another embodiment of communicating between devices having no common electrical ground. The method 800 includes sending at least one data signal and a synchronous clock signal to a modulator block having a Boolean logic gate for each data signal at block 802. The method 800 further includes sending at least one modulated data signal from the modulator block to a transformer block which also receives the synchronous clock signal at block 804. The method 800 further includes sending at least one modulated data signal and the synchronous clock signal from the transformer block to a demodulator block at block 806. The method 800 further includes sending at least one data signal from the demodulator block to a third device at block 808. The third device may be designed to receive a continuous (demodulated) signal. The third device receives the restored data signal that originated from the first device.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Thus, according to embodiments of the present disclosure, systems, apparatuses and methods for providing a communication link between devices having no common electrical ground are described. The communication link may transfer multiple channels of synchronous high speed data between these devices by using inexpensive transformers in conjunction with a simple data clock rate modulation scheme.

While some specific embodiments of the disclosure have been shown the disclosure is not to be limited to these embodiments. For example, most functions performed by electronic hardware components may be duplicated by software emulation. Thus, a software program written to accomplish those same functions may emulate the functionality of the hardware components. The hardware logic may consist of electronic circuits that follow the rules of Boolean Logic, software that contain patterns of instructions, or any combination of both. The disclosure is to be understood as not limited by the specific embodiments described herein, but only by scope of the appended claims.

What is claimed is:

1. An apparatus comprising:
a transformer block having output and input ports to communicate a plurality of data signals and a synchronous clock signal between a first device with a first voltage ground reference and a second device with a second voltage ground reference over a data communication link, where the first device to send the plurality of data signals to one or more input ports of a modulator block having one or more Boolean logic gates to receive each data signal in combination with the synchronous clock signal and one or more output ports of the modulator block to send a plurality of modulated data signals corresponding to the plurality of data signals to the input ports of the transformer block, and wherein one or more of the output ports of the transformer block to send the plurality of modulated data signals and the synchronous clock signal to the second device to provide the data communication link between devices having different voltage ground references, wherein the transformer block has a first output coupled to a resistive divider and a second output coupled to a receiving device with single ended logic.

2. A system comprising:
a network interface device (NID) coupled to a digital subscriber loop access multiplexer, the NID located outside a building;
an input port of the NID coupled to receive a power signal from a power supply unit located inside the building, the power supply unit provides isolated DC power to the NID via a first and a second phone line located in the building, wherein the NID also includes:
logic coupled to a plurality of isolation transformers;
a subscriber line interface circuit (SLIC) coupled to one or more isolation transformers of the plurality of isolation transformers and one of the first or second phone line; and
the plurality of isolation transformers having output and input ports to communicate a corresponding plurality of data signals and a synchronous clock signal between the logic having a first voltage ground reference and the SLIC having a second voltage ground reference over a data communication link.

3. The system of claim 2, wherein the logic to send the plurality of data signals to a modulator block having a Boolean logic gate to receive each data signal in combination with the synchronous clock signal.

4. The system of claim 3, wherein the modulator block further comprises output ports to send a plurality of modulated data signals to the input ports of the plurality of isolation transformers.

5. The system of claim 4, wherein the output ports of the plurality of isolation transformers to send the plurality of modulated data signals and the synchronous clock signal to the SLIC.

6. The system of claim 2, further comprising:
input ports of a demodulator block to receive at least one modulated data signal and the synchronous clock signal from the transformer block, output ports of the demodulator block to send at least one demodulated data signal to a third device, wherein the demodulated data signal restores a data signal that originated from the first device.

7. The system of claim 2, wherein each transformer has a first output and a second output coupled to a receiving device with differential logic.

* * * * *